(12) United States Patent
Fein et al.

(10) Patent No.: US 7,576,444 B2
(45) Date of Patent: Aug. 18, 2009

(54) MICRO TURBINE SHEET DESIGN FOR GATHERING WIND ENERGY

(75) Inventors: Gene S. Fein, Lenox, MA (US); Edward Merritt, Lenox, MA (US)

(73) Assignee: Genedics LLC, Lenox, MA (US)

( * ) Notice: Subject to any disclaimer, the term of this patent is extended or adjusted under 35 U.S.C. 154(b) by 0 days.

(21) Appl. No.: 11/740,662

(22) Filed: Apr. 26, 2007

(65) Prior Publication Data
US 2008/0150298 A1   Jun. 26, 2008

Related U.S. Application Data

(63) Continuation-in-part of application No. 11/645,109, filed on Dec. 22, 2006, and a continuation-in-part of application No. 11/670,635, filed on Feb. 2, 2007, now Pat. No. 7,492,053, which is a continuation-in-part of application No. 11/645,109, filed on Dec. 22, 2006, application No. 11/740,662, which is a continuation-in-part of application No. 11/687,974, filed on Mar. 19, 2007, which is a continuation-in-part of application No. 11/645,109, filed on Dec. 22, 2006.

(51) Int. Cl.
*H02P 9/00* (2006.01)
*F03D 9/00* (2006.01)

(52) U.S. Cl. ............ 290/44; 290/1 R; 415/4.3

(58) Field of Classification Search ........ 290/1 R, 290/1 A, 43, 44, 54, 55; 415/4.2, 4.3
See application file for complete search history.

(56) References Cited

U.S. PATENT DOCUMENTS

| 3,971,454 A | 7/1976 | Waterbury |
| 4,117,900 A | 10/1978 | Amick |
| 4,119,863 A * | 10/1978 | Kelly ............ 290/55 |
| 4,314,160 A | 2/1982 | Boodman et al. |
| 4,315,402 A | 2/1982 | Sadhukhan |

(Continued)

FOREIGN PATENT DOCUMENTS

WO   WO 2006/121414 A   11/2006

(Continued)

OTHER PUBLICATIONS

Holmes, Andrew S., et al., "Axial-Flux Permanent Magnet Machines for Micropower Generation," Journal of Microelectrical Systems, vol. 14, No. 1, Feb. 2005.

(Continued)

*Primary Examiner*—Nicholas Ponomarenko
(74) *Attorney, Agent, or Firm*—Hamilton, Brook, Smith & Reynolds, P.C.

(57) ABSTRACT

Disclosed is a method and system for providing an energy gathering sheet to harness and provide energy to destinations, such as homes and businesses. The energy gathering sheet is configured to receive small wind energy gathering devices (e.g., in the micrometer to nanometer range), which are mounted on a single sheet for the purpose of creating efficient and clean energy to meet both small and large power demands. The single sheet of installable wind turbines may be loosely rolled or stacked to protect the integrity of the wind turbines, and are capable of being rolled out for efficient installation.

18 Claims, 6 Drawing Sheets

U.S. PATENT DOCUMENTS

| | | | |
|---|---|---|---|
| RE31,156 E | 2/1983 | Dessert | |
| 4,592,136 A | 6/1986 | Hirsch | |
| 4,883,823 A | 11/1989 | Perry et al. | |
| 5,075,564 A | 12/1991 | Hickey | |
| 5,254,876 A | 10/1993 | Hickey | |
| 5,272,378 A | 12/1993 | Wither | |
| 5,296,746 A | 3/1994 | Burkhardt | |
| 5,606,233 A | 2/1997 | Davis | |
| 5,920,127 A | 7/1999 | Damron et al. | |
| 6,391,205 B1 | 5/2002 | McGinnis | |
| 6,409,467 B1 | 6/2002 | Gutterman | |
| 6,590,363 B2 * | 7/2003 | Teramoto | 320/101 |
| 6,624,530 B1 | 9/2003 | Toulon | |
| 6,767,161 B1 * | 7/2004 | Calvo et al. | 404/71 |
| 6,809,432 B1 | 10/2004 | Bilgen | |
| 6,882,059 B1 | 4/2005 | DePaoli | |
| 6,897,575 B1 | 5/2005 | Yu | |
| 6,959,993 B2 | 11/2005 | Gross et al. | |
| 7,098,553 B2 | 8/2006 | Wiegel et al. | |
| 7,192,146 B2 | 3/2007 | Gross et al. | |
| 7,193,332 B2 | 3/2007 | Spinelli | |
| 7,226,536 B2 | 6/2007 | Adams | |
| 7,226,542 B2 | 6/2007 | Zemel et al. | |
| 7,245,034 B2 | 7/2007 | Johnson | |
| 7,339,286 B1 | 3/2008 | Chen | |
| 7,411,308 B2 | 8/2008 | Parmley | |
| 7,427,173 B2 * | 9/2008 | Chen | 404/71 |
| 7,434,636 B2 | 10/2008 | Sutherland | |
| 7,453,164 B2 * | 11/2008 | Borden et al. | 290/42 |
| 7,492,053 B2 * | 2/2009 | Fein et al. | 290/44 |
| 7,498,684 B2 * | 3/2009 | Fein et al. | 290/44 |
| 2004/0113291 A1 | 6/2004 | Klausner et al. | |
| 2004/0159536 A1 | 8/2004 | Kamen et al. | |
| 2005/0230238 A1 | 10/2005 | Klausner et al. | |
| 2006/0113118 A1 | 6/2006 | Kim | |
| 2006/0137348 A1 | 6/2006 | Pas | |
| 2007/0138797 A1 | 6/2007 | Reidy et al. | |
| 2007/0284885 A1 | 12/2007 | Menges | |
| 2008/0054638 A1 | 3/2008 | Greene et al. | |
| 2008/0148732 A1 | 6/2008 | Fein et al. | |
| 2008/0148733 A1 | 6/2008 | Fein et al. | |
| 2008/0149302 A1 | 6/2008 | Fein et al. | |
| 2008/0149403 A1 * | 6/2008 | Fein et al. | 180/2.2 |
| 2008/0149573 A1 | 6/2008 | Fein et al. | |
| 2008/0150284 A1 | 6/2008 | Fein et al. | |
| 2008/0150286 A1 | 6/2008 | Fein et al. | |
| 2008/0150289 A1 | 6/2008 | Fein et al. | |
| 2008/0150291 A1 * | 6/2008 | Fein et al. | 290/55 |
| 2008/0150296 A1 | 6/2008 | Fein et al. | |
| 2008/0152492 A1 | 6/2008 | Fein et al. | |
| 2008/0154800 A1 | 6/2008 | Fein et al. | |
| 2008/0154801 A1 | 6/2008 | Fein et al. | |
| 2008/0163919 A1 | 7/2008 | Fein et al. | |
| 2008/0196758 A1 * | 8/2008 | McGuire | 136/245 |

FOREIGN PATENT DOCUMENTS

| | | |
|---|---|---|
| WO | WO 2006/138516 A | 12/2006 |
| WO | WO 2008/079369 | 7/2008 |
| WO | WO 2008/115479 A2 | 9/2008 |
| WO | WO 2008/136901 A2 | 11/2008 |

OTHER PUBLICATIONS

Zhong Lin Wang and Jinhui Song, "Piezoelectric Nanogenerators Based on Zinc Oxide Nanowire Arrays," Science, vol. 312, Apr. 14, 2006.

www.metropolismag.com, 6 pages, retrieved from Internet Apr. 19, 2007.

www.greencarcongress.com, 4 pages, retrieved from Internet Apr. 19, 2007.

www.panasonic.co.jp, 8 pages, retrieved from Internet Jan. 26, 2007.

Bourouni, K., et al., Experimentation and Modelling of an Innovative Geothermal Desalination Unit, *Desalination 125*, pp. 147-153 (Nov. 9-12, 1999).

Tzen, E., et al., "Renewable Energy Sources for Desalination," *Solar Energy 75*(5), pp. 375-379 (Nov. 1, 2003).

Garcia-Rodriguez, L., "Seawater Desalination Driven by Renewable Energies: A Review," *Desalination 143*(2), pp. 103-113 (May 20, 2002).

Kalogirou, S.A., "Seawater Desalination Using Renewable Energy Sources," *Progress in Energy and Combustion Science 31*(3), pp. 242-281 (Jan. 1, 2005).

Belessiotis, V., et al., "The History of Renewable Energies for Water Desalination," *Desalination 128*, pp. 147-159 (2000).

Awerbuch, L., et al., "Geothermal Energy Recovery Process," *Desalination 19*, pp. 325-336 (1976).

International Search Report for PCT/us2008/006034, date of mailing Oct. 24, 2008.

* cited by examiner

MICRO TURBINE SHEET DESIGN FOR GATHERING WIND ENERGY

RELATED APPLICATIONS

This application is a continuation in part application of U.S. application Ser. No. 11/645,109, entitled "SYSTEM AND METHOD FOR CREATING A NETWORKED INFRASTRUCTURE DISTRIBUTION PLATFORM OF FIXED AND MOBILE SOLAR AND WIND GATHERING DEVICES", filed on Dec. 22, 2006. This application is also a continuation in part application of U.S. application Ser. No. 11/670,635, entitled "SYSTEM AND METHOD FOR CREATING A NETWORKED VEHICLE INFRASTRUCTURE DISTRIBUTION PLATFORM OF SMALL WIND GATHERING DEVICES", filed on Feb. 2, 2007 now U.S. Pat. No. 7,492,053, which is a continuation in part application of U.S. application Ser. No. 11/645,109, filed on Dec. 22, 2006. This application is also a continuation in part application of U.S. application Ser. No. 11/687,974, entitled "WIND TURBINE AND SOLAR GATHERING HYBRID SHEETS", filed on Mar. 19, 2007, which is a continuation in part application of U.S. application Ser. No. 11/645,109, filed on Dec. 22, 2006. The entire teachings of the above applications are incorporated herein by reference.

BACKGROUND OF THE INVENTION

It is well known that wind power turbines can generate power that can be delivered via interconnection to existing grid systems or can be used to power individual homes, businesses, and utilities. Most, if not all, wind power systems that are used to gather large amounts (in the megawatt range) of power are large-structure wind turbines, many of which are at least one-hundred feet high. In the past, smaller wind powered turbines have also been placed high up from the ground, usually at least fifteen feet high. Additionally, most smaller wind power turbine systems are utilized to power a single home, business, or components of that home or business.

Currently, large wind installations (e.g., one-hundred feet or greater) dot the landscape of the planet. These turbines are often positioned in remote fields, out to sea, or on private property away from public infrastructure. Smaller wind turbine installations (e.g., five to thirty feet) and other energy gathering devices are typically utilized in three deployments. The first deployment features clusters of small to mid-sized turbines set up in remote windy areas such as the desert environment near Palm Desert, Calif. The second deployment features isolated powering of small homes and businesses, such as those in remote arctic or other extremely cold climates where heating and cooling infrastructure do not exist, or are augmented at the micro-use level for a single home or business. The third deployment features isolated powering of entities for government utilities, such as the isolated powering of single light stands at the Hanauma Bay National Park public parking lot in Oahu, Hawaii.

Conventional models can address power plant or isolated-use situations for the generation and distribution of wind power. Large turbines generate megawatt volumes of power to be utilized locally or interconnected back to a grid system. Smaller wind generation systems are typically used to solve local power issues, such as street lights, home, or business needs. Smaller wind generation systems can also be interconnected to a grid system for the purpose of selling the power that is generated by the system to a public or private utility.

SUMMARY OF THE INVENTION

Existing conventional uses of wind turbines have certain limitations in distribution and deployment, and large turbines have faced environmental and Defense Department concerns. Environmentalists fear that the noise and size of turbines will disrupt both, scenic and habitat conditions in addition to threaten the well being of birds that may be caught in the large turbine blades. The Department of Defense has raised concerns over the possible interference of the large turbines with radar signals and tracking. Large turbine systems that are placed far away from existing infrastructure also incur a large expense in the transportation or building of infrastructure to carry the power generated by the turbine system. Finally, the large turbine system represents a major, volatile investment for a single turbine. If wind is not present or wind currents change, then the turbine would be viewed as a poor investment because it will not generate enough power to be profitable. Furthermore, if the turbine breaks for any reason, it will produce zero power as it is a large and single entity. Large turbines also require labor intensive maintenance and monitoring. The life cycle for large wind turbines is about twenty years, and decommissioning the large wind turbine is yet another environmental issue with which must be contended.

Small wind power utilized in isolated areas and for private homes, businesses, or individual use is a great way to introduce clean energy on a unit-by-unit grass roots level. As such, the present invention provides wind turbine power using very small, noiseless to low-noise wind turbines for the purposes of creating energy to meet both small and large power demands. It should be noted that small wind power turbines are inefficient to install individually once they reach a certain decreasing size, therefore, the turbines may be mounted on a single sheet, of installable material that may be loosely rolled or stacked in sheets to protect the integrity of the turbines and allow for large areas of sheeted turbines to be rolled out and efficiently installed. The power generated by the very small wind turbines can be sent to existing electrical grids or to residential homes, businesses, or systems without connecting to the existing grids.

According to an example embodiment of the present invention, an energy gathering system includes a sheet that has circuit connections configured to receive a plurality of energy gathering devices, and includes at least one interface configured to electrically connect to and provide energy to a destination, such as an electrical grid, a residential home, a business, a vehicle, or an electrical roadway system. The sheet may also connect to other energy gathering sheets via the interlace.

The energy gathering devices may include wind energy generating devices, and may be less than one inch in size. The sheet may be made of a variety of materials including polymer or metal, may include trapped gas or fluid, and may include a protection layer that protects the sheet when rolled or slacked. The protection layer may be torn away from the sheet upon installation.

Additionally, the sheet may include a storage unit that stores energy harnessed by the sheet, a processing unit that processes information relating to the sheet, a transmitter that transmits the information to a reporting system, and at least one anchor used to affix the sheet to a surface. The information processed by the processing unit may relate to the amount of energy stored in the storage unit, and the anchor may affix the sheet to a surface by clamping, locking, interlocking, gluing, painting on, adhering, or magnetizing the sheet to the surface.

BRIEF DESCRIPTION OF THE DRAWINGS

The foregoing will be apparent from the following more particular description of example embodiments of the invention, as illustrated, in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

The present invention addresses various problems of isolated large wind turbine Installations. For instance, isolated turbine Installations do not have the ability to directly power entities, such as businesses or residential sites, over a long stretch of land covering tens, hundreds, thousands, or hundreds of thousands of miles, and do not provide easy access to multiple grid interconnection points. On the other hand, small turbines enable efficient use of space and reduce costs related to the gathering of clean energy, however, individual implementations become more tedious and challenging as the turbines get smaller, especially for turbines that are under one inch in either horizontal or vertical measurement.

Accordingly, there Is a need for an integrated tiny wind turbine power infrastructure that can easily be connected to multiple direct sources or various grid interconnection points. Components of these very small wind turbines, such as the tiny wiring from turbines forming a tiny wiring grid with wire turbines on the micrometer scale, together have been shown to have super-conductive properties that may help increase the energy gathering efficiency of the tiny wind turbines. Further, turbines of various sizes may be made (e.g., wind turbines in the fifty micrometer size that are constructed with advanced lithography and laser tools, to tiny wind turbines that are an eighth of an inch long and up that can be made via standard molding and forming processes). Additionally, the use of tiny wind turbines allows for the deployment of billions of turbines in spaces where larger turbines could not fit, such as curved guardrails, or on top of vehicles. The tiny turbines may be mounted vertically or horizontally in positions that would not be functional for larger turbines.

The functions of the tiny turbines are wide-ranging, from generating heat with the generated energy by affixing them to winter jackets and gloves, to rolling out large strips of installable sheets of tiny turbines for use on public and private highways in a median or outside of a breakdown lane. Moreover, private highways and municipalities have existing maintenance crews as well as existing relationships with contracted infrastructure building providers who can be trained to install the wind generation systems along specified parts of roadways.

The small wind generating devices offer numerous advantages. First, the wind power generation systems can be small and noiseless, and may be small enough to lit millions or billions of tiny turbines on a median between opposite sides of a divided highway. Second, the energy generated by the devices may be distributed directly to homes or businesses (e.g., along the highway route). Further, the generated energy could be used to supply clean power for the electrolysis of hydrogen to filling stations along a highway, either utilizing hydrogen conversion at individual filling stations or at a conveniently located hydrogen conversion plant adjacent to the highway or roadway. Third, other clean energy sources such as solar, geothermal, and other heat conversion technologies may be used to create a multi-source clean energy "power grid" along with, or in tandem with, the existing grid.

Fourth, these infrastructures benefit the wind power generator companies as the roadway owner's may benefit from lease or easement revenue. A product could benefit from an easily installed "skin" or sheet of the tiny turbine energy gathering material, such as cold weather clothing. The small wind energy generating devices may also provide a stable and consistent infrastructure project generating a service provider economy for clean energy production as well as the environment. Fifth, roadways are a consistent source of wind, thus, by having small wind energy generating devices close to the ground, such as small noiseless spiral or helix-style turbines, the devices are able to capture wind energy generated by passing vehicles and existing wind currents. Sixth, the power generated by this system may also be connected to a grid system at many different and convenient points located close to the existing grid infrastructure. Additionally, by mounting numerous small turbines on sheets, the problem of both wiring and installation is solved, in large part with only the sheets left to install rather than the Individual turbines, which, may be preinstalled on the sheets.

The present invention, in accordance with one embodiment, is a series of tiny power generating wind turbines mounted on a single installation sheet that contains ah of the wiring necessary to transfer energy gathered by the turbines to an energy storage system, conditioning system, and distribution point. These turbines can serve a variety of uses by generating-small or large amounts of energy based on the number and size of the turbines that are deployed in a given installation. The micro turbines can be manufactured using nanotechnology practices and, for example, may be as large as one half of an inch in any dimension, or as small as a few hundred nanometers. These tiny wind turbines can be manufactured on sheets of any size, though, most sheets may be no larger than five feet in length. The turbines are wired together to efficiently distribute the total electricity gathered by all of the turbines on an installation sheet and transfer that electricity to an organized distribution system or desired destination point. Moreover, the sheets can be cut to fit specific installation sizes before they leave the factory or distribution point.

Figure 1:
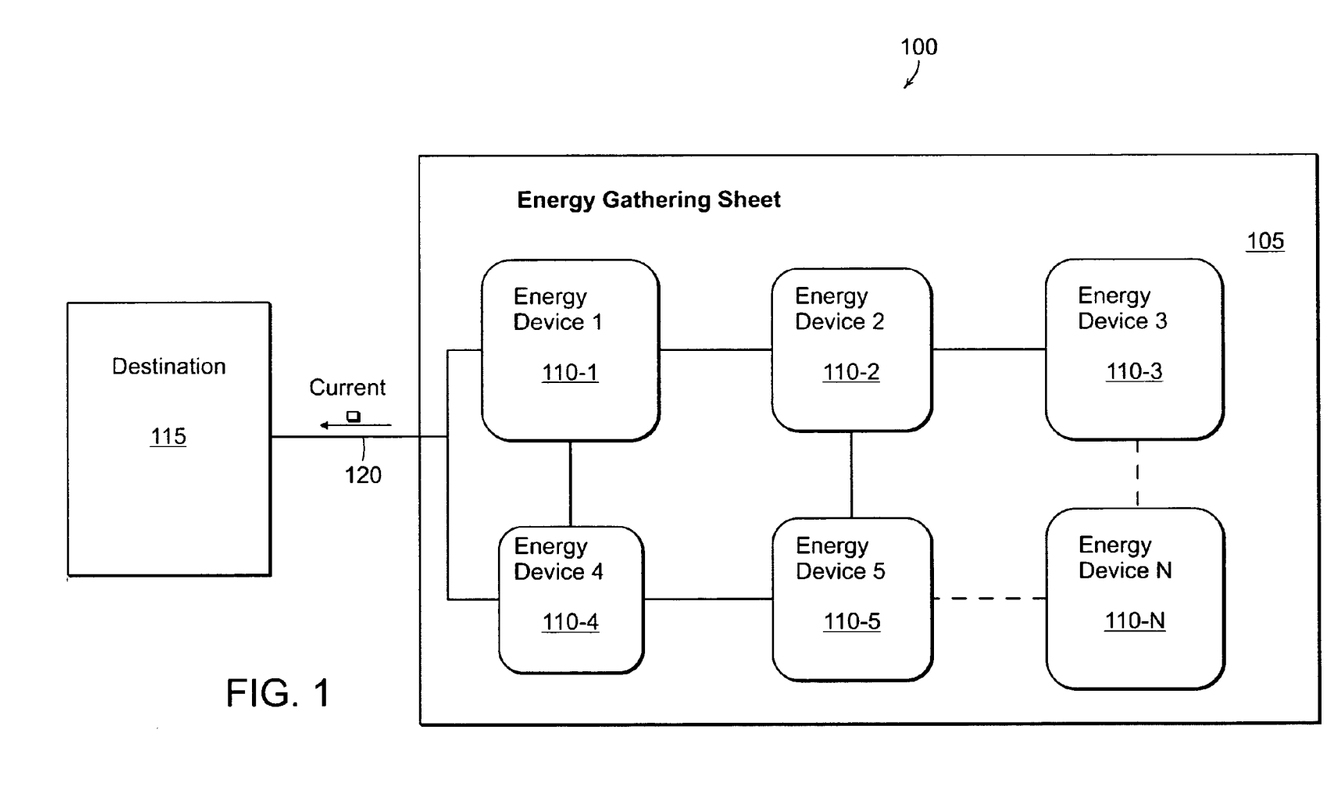
FIG. 1 is a block diagram illustrating an energy gathering system in accordance with an embodiment of the present invention.

FIG. 1 is a block diagram illustrating an energy gathering system 100 in accordance with an embodiment of the present invention. The energy gathering system 100 includes a sheet 105 configured to receive a plurality of energy gathering devices 110-1 . . . 110-N, where "N" is any number of energy gathering devices. The energy gathering devices 110-1 . . . 110-N may be wind energy generating turbines capable of harnessing wind energy, and may be of various sizes, for example, ranging in the nanometer to micrometer range. The sheet 105 includes ah of the necessary circuitry required to connect the energy gathering devices 110-1 . . . 110-N, and includes circuit connections 120 that provide energy to a destination 115. The energy generating devices 110-1 . . . 130-N may be installed on the sheet 105 either at the manufacturer's facility or in the field.

Figure 2:
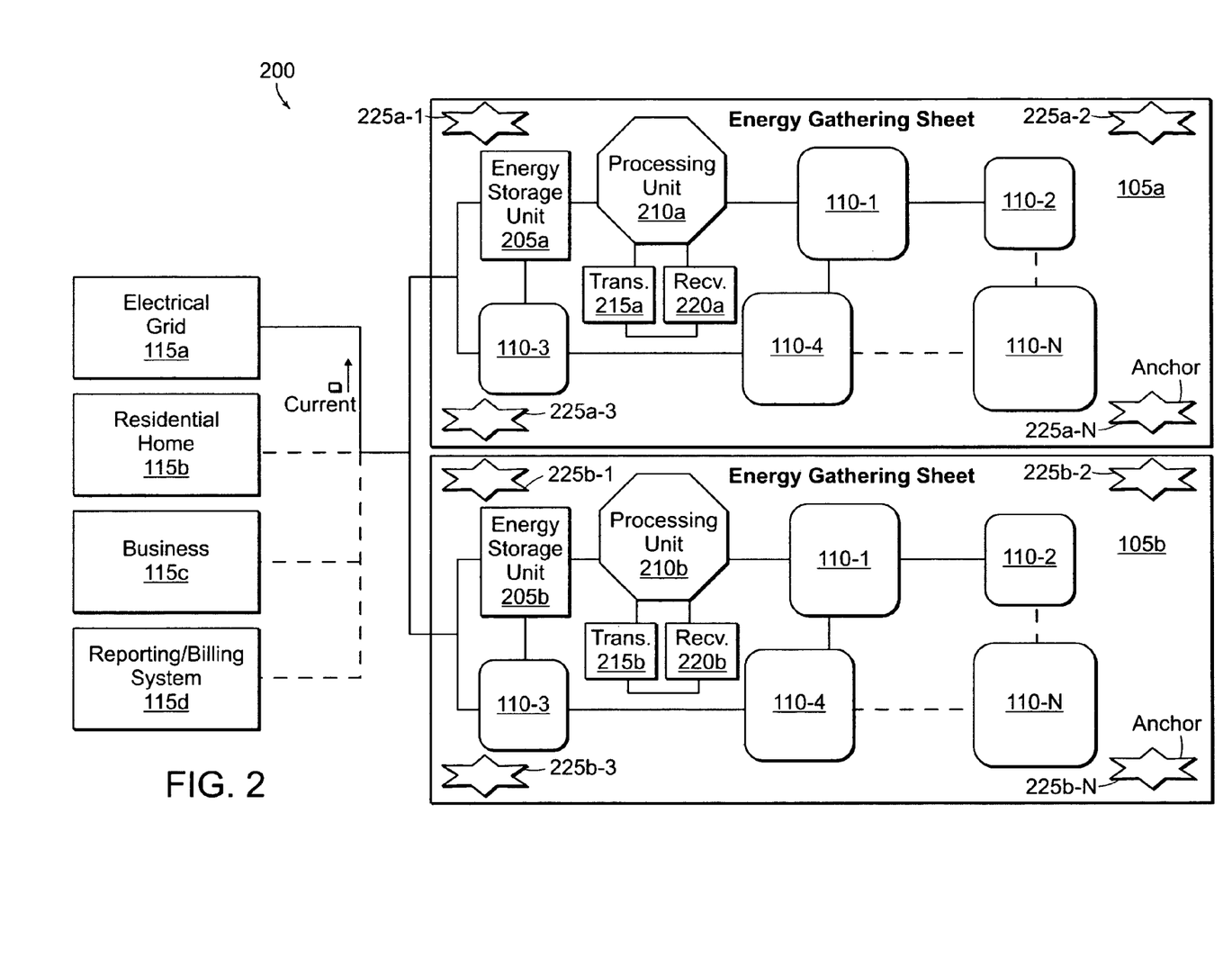
FIG. 2 is a block diagram illustrating an energy gathering sheet connected to another energy gathering sheet in accordance with an embodiment of the present invention.

FIG. 2 is a block diagram illustrating an energy gathering system 200 with a first sheet 105a connected to a second sheet 105b, and the sheets 105a-b providing harnessed/generated energy to a destination 115 in accordance with an embodiment of the present invention. The destination 115 may be an electrical grid 115a, a residential home 115b, a businesses 115c, or a reporting and billing system 115d. The second sheet 105b may include components that are similar to the components of the first sheet 105a. Further, both sheets 105a-b include an energy storage unit 205, a processing unit 210, a transmitter 215, and a receiver 220.

The energy storage unit 205 stores the harnessed energy from the plurality of energy gathering devices 110-1 . . . 110-N. The processing unit 210 processes information that is related to the energy gathering sheet 105, which may include, for example, the amount of stored energy in the storage unit 205, or the operational status of the sheet 105. The operational status, for example, may indicate that one of the energy gathering devices 110-1 . . . 110-N is out of service due to a faulty blade an a wind energy gathering device. In another example embodiment, the information may relate to the amount, of power that each of the energy gathering devices 110-1 . . . 110-N has harnessed within a given period of time.

In one embodiment, the transmitter 215 transmits information related to the energy gathering sheet 105 to a reporting and billing system 115d, and the receiver 220 receives other information from the reporting system 115d. The information received, for example, may be a signal to shut down one of the plurality of energy gathering devices 110-1 . . . 110-N. The processing unit 210 may then, in response to the receiver 220 receiving such a command signal, shut down one of the plurality of energy gathering devices 110-1 . . . 110-N. The transmitter 215 and the receiver 220 may send the information to the destination 115a-d via a hard line or wireless connection following protocols and methods known in the industry. Additionally, the transmitter 215 and/or the receiver 220 may be coupled to a computer network, such as the internet, (not shown) through many interlaces including but not limited to a Local Area Network. (LAN), a Wide Area Network (WAN), a dial-up connection, a cable modem, or a special high speed Integrated Services Digital Network (ISDN) line.

The energy gathering sheets 105a-b may include a strong polymer material that may be the only material used in the sheet skeleton, or that may be reinforced with metal, a material layer, a magnetic layer, an insulation layer, a trapped gas layer, or a trapped fluid layer. The sheets' 105a-b external polymers or film may be so smooth, that it repels debris better than the bare ground. The sheets 105a-b may be delivered to an installation site with the energy gathering devices 110-1 . . . 110-N already installed, or with specified spots (area location) for mounting the devices, thus, assuring proper spacing between the energy gathering devices 110-1 . . . 110-N and efficient shipping. The sheets 105a-b may be pre-wired so that in the field the energy gathering devices 110-1 . . . 110-N merely need to be connected together or connected to a power storage or distribution element to enable the flow of electricity.

The sheets 105a-b may be anchored by at least one anchoring mechanism 225-1 . . . 225-N, where "N" is any number of anchoring mechanisms, to an installation site based on the specifications of the site. For example, along a road, the sheets 105a-b may be anchored at the sheet corners to a desired surface, such as the ground. The sheets 105a-b may also be tacked down by strips of material that run lengthwise and widthwise using the anchoring mechanisms 225-1 . . . 225-N as primary skeletal reliance points in terms of force and stress placed upon the sheets 105a-b in operation. The sheets 105a-b or anchoring mechanisms 225-1 . . . 225-N may also be clamped, locked, interlocked, glued, painted on, otherwise adhered, or magnetized onto specific installation sites. Tiny wired or wireless sensors, relays, or micro sensors, such as reciprocities with transmitters suitable for sending data to ultimately be received within the reporting and billing system 115d, may be attached to the wired exit point on each sheet to gauge electrical power flow similar to a crude totalizing meter. This allows the efficiency of the individual or groups of sheets 105a-b to be monitored remotely.

In another example, sheets 105 carrying small energy gathering devices 110 may be coupled to vehicles on roadways. Such coupling is advantageous for capturing atmospheric wind and vehicle in motion produced wind energy. See U.S. application Ser. No. 11/670,635, incorporated herein by reference.

Figure 3A:
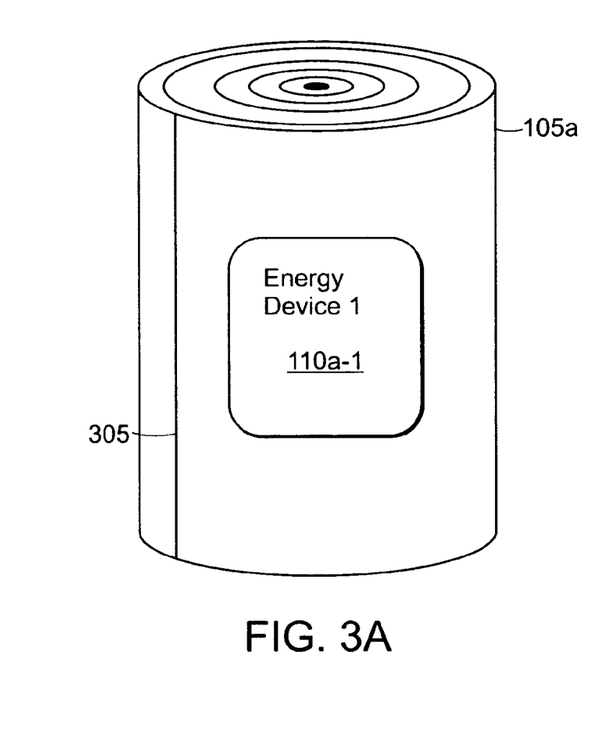
FIGS. 3A and 3B are schematic diagrams illustrating energy gathering sheets capable of being stored in a rolled or stacked position in accordance with an embodiment of the present invention.
Figure 3B:
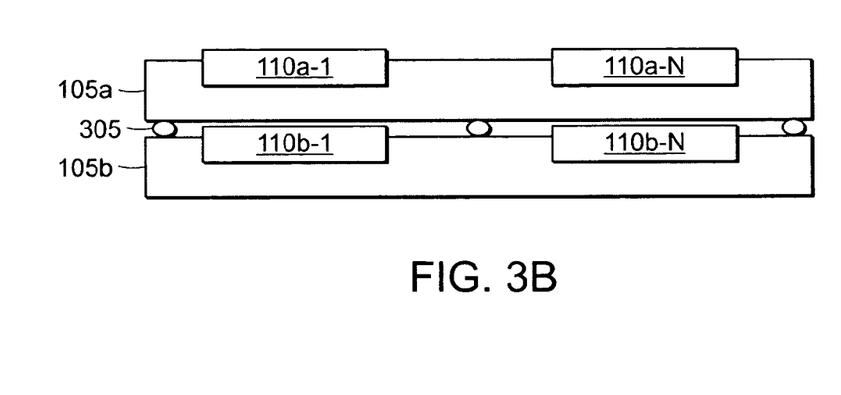

FIGS. 3A and 3B are block diagrams illustrating energy gathering sheets capable of being stored in a rolled or stacked position, respectively, in accordance with an embodiment of the present invention. The energy gathering devices 110-1 . . . 110-N, may be protected when in a roiled position (FIG. 3A) or stacked position (FIG. 38) while being shipped from a factory, or put into storage. Such protection is attained through the use of tear-away sheet separators 305. The separators protect the sheets from the weight and force of the rolled or stacked sheets, and prevent damage to the turbines during travel or storage. For example, the separators 305 may be similar to pizza box spacers, except rather than being made of plastic, they 305 may be made from recycled paper. Additionally, the sheets 105a-b have the advantage of being able to have the energy gathering devices 110-1 . . . 110-N, such as turbines of different sizes, installed on the sheet 105 in a random order, or in a properly spaced stratum configuration for example.

Figure 4:
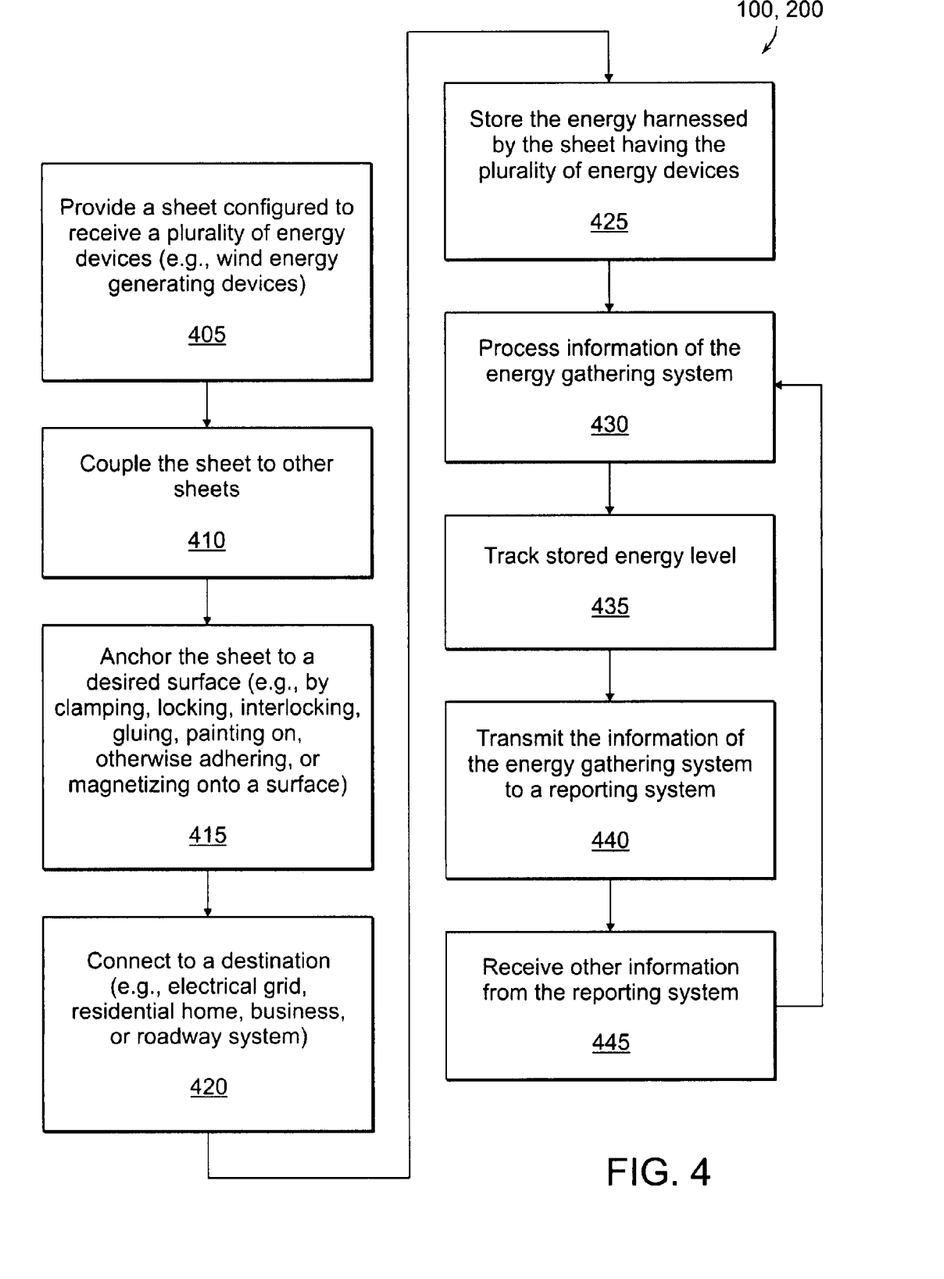
FIG. 4 is a flow diagram illustrating providing an energy gathering system in accordance with an embodiment of the present invention.

FIG. 4 is allow diagram illustrating providing an energy gathering system 100, 200 (FIGS. 1 and 2) in accordance with an embodiment of the present invention. An energy gathering system is provided that includes a sheet having circuit connections configured to receive energy devices, such as wind energy generating devices, having various sizes (e.g., in the micrometer to the nanometer range) (405). The sheet may be electrically coupled to other sheets in order to harness more energy (410).

Each sheet may be anchored by at least one anchoring mechanism to an installation site based on the specifications of the installation site (415). For example, along a road, the sheets may be anchored at the sheet corners to a desired surface, such as the ground. The sheets may also be tacked down by strips of material that run length and width wise using the mechanisms as primary skeletal reliance points in terms of force and stress placed upon the sheets in operation. The sheets, or anchoring mechanisms, may also be clamped, locked, interlocked, glued, painted on, otherwise adhered, or magnetized onto specific installation sites.

The sheet is then electrically connected to a destination to which it provides energy (420). The destination may be a electrical grid, a residential home, a business, or a reporting and billing system. The energy gathering system can store the energy harnessed by the sheet by storing the energy in the energy storage unit (425). A processing unit may process information that is related to the energy gathering sheet (430), which may include, for example, keeping track of the amount of energy stored in the storage unit (435), or the operational status of the sheet. In another example, the information is related to the amount of power that each of energy gathering devices has harnessed.

A transmitter 215 may then transmit information related to the energy gathering sheet to a destination, such as a reporting and billing system (440), and the receiver may receive other information from the destination (445). In an example embodiment, the other information may include a signal to shut down one of the energy gathering devices. The processing of information, as well as the sending and receiving of information, may continue while the sheet remains in operation as illustrated by the loop from 445 to 430 in FIG. 4.

Figure 5:
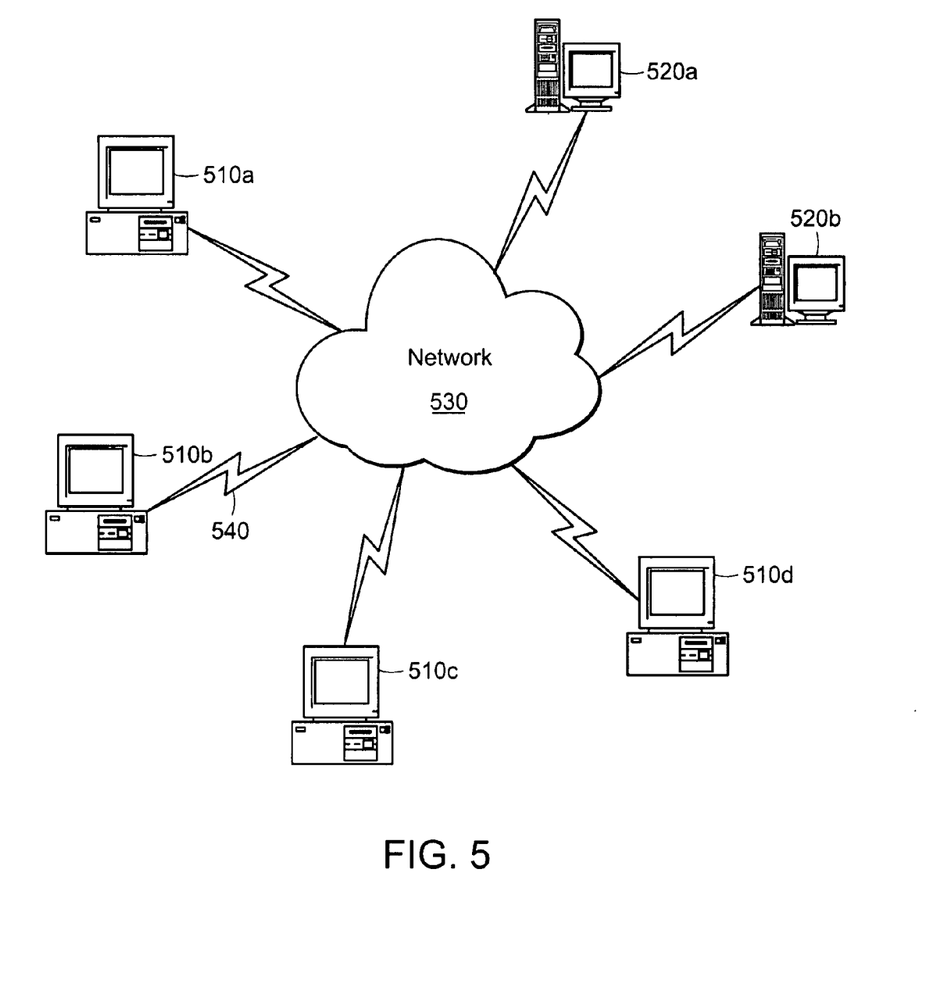
FIG. 5 is a schematic view of a computer network in which embodiments of the present invention operate.

FIG. 5 is a schematic view of a computer network in which embodiments of the present invention operate. Client devices 510 and server devices 520 provide processing, storage, and input/output devices executing application programs and the like. Client devices 510 can also be linked through a communications network 530 to other computing devices, including other client devices 510 and server devices 520. The communications network 530 may be part of a remote access network, a global network (e.g., the Internet), a worldwide collection of computing devices, local area or wide area networks, and gateways that currently use respective protocols (TCP/IP, Bluetooth, etc.) to communicate with one another. Other electronic device/computer network architectures are also suitable.

Figure 6:
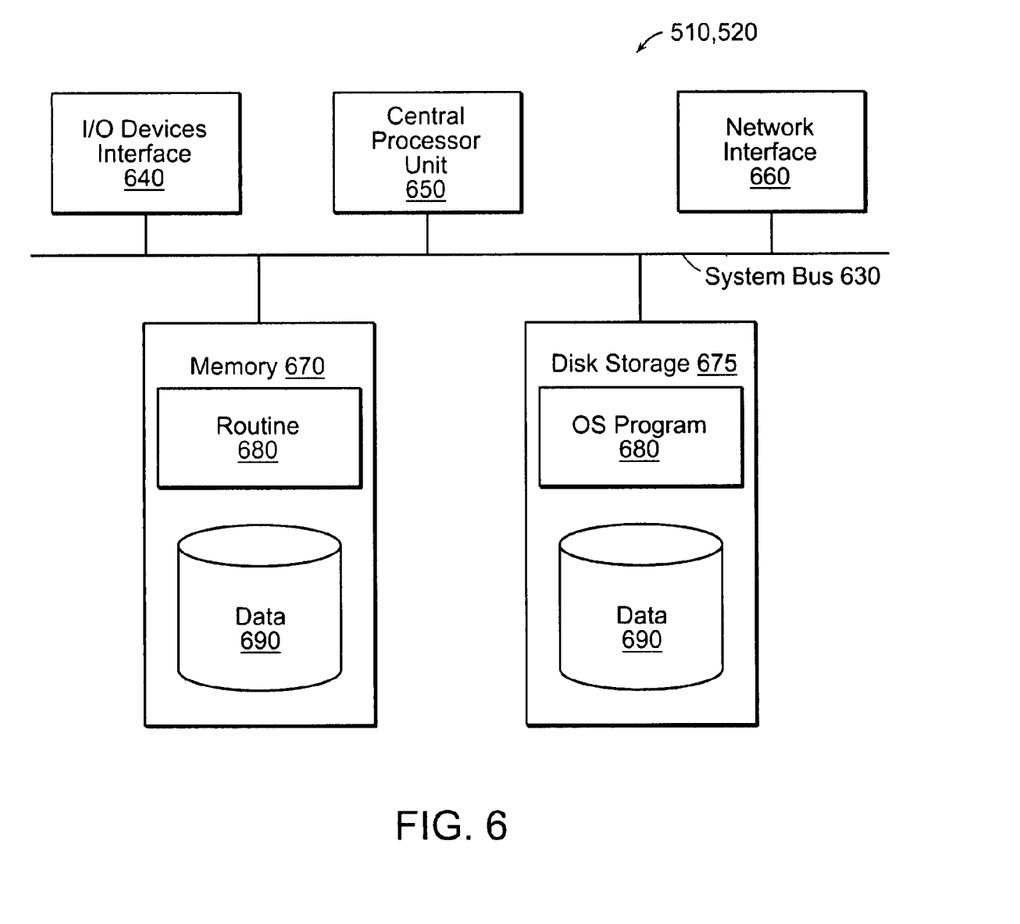
FIG. 6 is a block diagram of a computer node/device in the network of FIG. 5.

FIG. 6 is a block diagram of a computer node/device 510, 520 in the network of FIG. 5. Each device 510, 520 contains a system bus 630, where a bus is a set of hardware lines used for data transfer among the components of a device or processing system. The bus 630 is essentially a shared conduit that connects different elements of a device (e.g., processor, disk storage, memory, input/output ports, network ports, etc.) that enables the transfer of information between the elements. Attached to the system bus 630 Is an I/O device interface 640 for connecting various input and output devices (e.g., keyboard, mouse, displays, printers, speakers, etc.) to the device 510, 520. A network interface 660 allows the device to connect to various other devices attached to a network (e.g., network 530 of FIG. 5). Memory 670 provides volatile storage for computer software instructions 680 and data 690 used to implement an embodiment of the present invention (e.g., the energy gathering sheets detailed above in FIGS. 1-3 and the method/process detailed above in FIG. 4). Disk storage 675 provides non-volatile storage for computer software instructions 680 and data 690 used to implement an embodiment of the present invention. Central processor unit 650 is also attached to the system bus 630 and provides for the execution of computer instructions.

In one embodiment, the processor routines 680 and data 690 are a computer program product (generally referenced 680), including a computer readable medium (e.g., a removable storage medium such as one or more DVD-ROM's, CD-ROM's, diskettes, tapes, etc.) that provides at least a portion of the software instructions for the invention system. The computer program product 680 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 540 (FIG. 5) embodiment on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 680.

In alternate embodiments, the propagated signal is an analog carrier wave or digital signal carried on the propagated medium. For example, the propagated signal may be a digitized signal propagated over a global network (e.g., the internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 680 is a propagation medium that the device 510 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like. Further, the present invention may be implemented in a variety of computer architectures. The computer network of FIGS. 5 and 6 are for purposes of illustration and are not a limitation of the present invention.

While this invention has been particularly shown and described with references to preferred embodiments thereof it will be understood by those skilled in the art that various changes in form and details may be made therein without departing from the scope of the invention encompassed by the appended claims.

It should be understood that there may be destinations other than the destinations discussed above, such as an existing electrical power company, and that there may be more than two energy gathering systems with their respective sheets coupled together. For example, there may be hundreds of sheets electrically connected together in the installation location. It should be further understood that the flow diagram of FIG. 4 is merely exemplary, and other configurations, arrangements, additional blocks, fewer blocks, and so forth are possible in other embodiments.

What is claimed is:

1. An energy gathering system, comprising:
   an energy gathering sheet having circuit connections configured to receive a plurality of less than one inch in size wind energy gathering devices; and
   at least one interface configured to electrically connect to and provide energy to a destination from the energy gathering sheet.

2. The system of claim 1 wherein the destination includes at least one of an electrical grid, a residential home, a businesses, and a roadway based alternative energy system.

3. The system of claim 1 wherein the sheet is coupled to a vehicle.

4. The system of claim 1 further comprising a protection layer to protect the sheet when rolled or stacked.

5. The system of claim 4 wherein the protection layer may be torn away from the sheet.

6. The system of claim 1 wherein the sheet includes at least one of polymer, metal, trapped gas, and trapped fluid.

7. The system of claim 1 wherein the at least one interface is configured to connect to other energy gathering sheets.

8. The system of claim 1 further comprising:
a storage unit configured to store energy harnessed by the sheet;
a processing-unit configured to process information relating to the sheet;
a transmitter configured to transmit the information to a reporting system; and
at least one anchor configured to affix the sheet to a surface.

9. The system of claim 8 wherein the information includes information relating to the amount of energy stored in the storage unit.

10. The system of claim 8 wherein the at least one anchor is at least one of clamped, locked, interlocked, glued, painted on, adhered, and magnetized to the surface.

11. A method for gathering energy in a roadway energy system, the method comprising:
providing an energy gathering sheet having circuit connections configured to receive a plurality of wind energy gathering devices less than one inch in size;
electrically connecting the energy gathering sheet to a destination; and
providing energy generated by the energy gathering sheet to the destination.

12. The method of claim 11 wherein electrically connecting the sheet to a destination includes connecting at least one of an electrical grid, a residential home, a business, and a roadway based alternative energy system.

13. The method of claim 11 further comprising coupling the sheet to a vehicle.

14. The method of claim 11 wherein providing the sheet includes providing a protection layer to protect the sheet when, rolling or stacking the sheet.

15. The method of claim 11 wherein the sheet includes at least one of polymer, metal, trapped gas, and trapped fluid.

16. The method of claim 11 further comprising:
storing energy harnessed by the energy gathering devices;
processing information relating to the sheet;
transmitting the information to a reporting system;
coupling the sheet to other sheets; and
affixing the sheet to a surface.

17. The method of claim 16 wherein processing the information includes tracking stored energy levels.

18. The method of claim 16 wherein affixing the sheet to the surface includes at least one of clamping, locking, interlocking, gluing, painting on, adhering, and magnetizing the sheet to the surface.

* * * * *